US008636449B2

United States Patent
Hynous et al.

(10) Patent No.: US 8,636,449 B2
(45) Date of Patent: Jan. 28, 2014

(54) INNER CASING VACUUM SYSTEM FOR A GAS TURBINE ENGINE CASING

(75) Inventors: Andrew Thomas Hynous, Greenville, SC (US); Brian Ralph Thompson, Valrico, FL (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 13/095,498

(22) Filed: Apr. 27, 2011

(65) Prior Publication Data

US 2012/0275873 A1 Nov. 1, 2012

(51) Int. Cl.
*B23B 47/34* (2006.01)

(52) U.S. Cl.
USPC .......................................... 408/1 R; 408/67

(58) Field of Classification Search
USPC .................... 408/67, 1 R; 409/137
See application file for complete search history.

(56) References Cited

U.S. PATENT DOCUMENTS

| | | | |
|---|---|---|---|
| 4,738,571 A * | 4/1988 | Olson et al. | 409/137 |
| 5,034,041 A * | 7/1991 | Austin | 55/385.1 |
| 7,337,521 B2 | 3/2008 | Henzler et al. | |
| 2009/0181606 A1* | 7/2009 | Loveless et al. | 451/456 |
| 2012/0132872 A1* | 5/2012 | Herbold et al. | 254/92 |
| 2012/0145976 A1* | 6/2012 | Hynous et al. | 254/98 |

FOREIGN PATENT DOCUMENTS

| | | | | |
|---|---|---|---|---|
| DE | 10053128 C1 * | 8/2002 | | B23B 45/00 |
| DE | 10258301 A1 * | 7/2004 | | B28D 7/02 |
| EP | 0799674 A1 * | 10/1997 | | B23Q 11/00 |
| GB | 2240735 A * | 8/1991 | | B23B 3/26 |

* cited by examiner

*Primary Examiner* — Daniel Howell
*Assistant Examiner* — Ryan Rufo
(74) *Attorney, Agent, or Firm* — Nixon & Vanderhye, P.C.

(57) ABSTRACT

A method of drilling one or more holes, substantially in situ, in a turbomachine casing includes locating piping including at least one vacuum head within the turbomachine casing in proximity to a hole to be drilled; drilling at least one hole in the casing such that drill chips or shavings caused by the drilling are collected in the vacuum head; and applying a vacuum through the piping to the at least one vacuum head to thereby remove the drill chips or shavings collected in the vacuum head to a location outside the turbomachine casing.

18 Claims, 5 Drawing Sheets

INNER CASING VACUUM SYSTEM FOR A GAS TURBINE ENGINE CASING

BACKGROUND

The present invention relates generally to turbomachines and, more specifically, to the drilling of holes in a turbomachine casing section without having to remove and relocate the casing section to a work area.

There are occasions when it is necessary to install ancillary components, for example, engine health sensor packages or other instrumentation, on a turbine and/or compressor casing. Typically, multiple holes are drilled into the casing in order to mount the various components and/or sensors. Because of the potential and even likely damage to rotating rotor components caused by loose drill chips or shavings, the casing section (generally the upper casing section) is removed completely from the lower casing section and placed on the ground or other supporting structure, away from the lower casing section. While this approach eliminates the concern for loose drill chips or shavings during subsequent turbine operation, it requires additional heavy-duty equipment and costly extended engine downtime.

It would therefore be desirable to provide a methodology and related apparatus by which casing drilling could be carried out while the upper casing remains substantially in situ, but while also eliminating the potential for loose drill chips or shavings from dropping down into the lower casing section which supports the rotatable blade and/or bucket wheels of the turbine engine or compressor rotor.

BRIEF SUMMARY OF THE INVENTION

Accordingly, in one exemplary but nonlimiting embodiment, there is provided a method of drilling one or more holes, substantially in situ, in a turbomachine casing, comprising: locating piping including at least one vacuum head within the turbomachine casing in proximity to a hole to be drilled; drilling at least one hole in the turbomachine casing such that drill chips or shavings caused by the drilling are collected in the vacuum head; and applying a vacuum through the piping to the at least one vacuum head to thereby remove the drill chips or shavings collected in the vacuum head to a location outside the turbomachine casing.

In another exemplary but nonlimiting embodiment, the invention provides a method of drilling a plurality of holes, substantially in situ, in a turbomachine casing having separable upper and lower casing sections comprising: raising the upper casing section a predetermined distance above the lower casing section; for each of said plurality of holes, installing piping including a vacuum head into the upper casing section, locating the vacuum head in proximity to the respective hole to be drilled, and so that the piping extends from each vacuum head to a location outside the upper casing section; drilling the plurality of holes in the upper casing section such that drill chips or shavings caused by the drilling are collected in the vacuum head associated with each respective hole; and applying a vacuum through the piping to each vacuum head to thereby remove the drill chips or shavings collected in each vacuum head to a location outside the upper casing section.

In still another exemplary but nonlimiting embodiment, the invention provides an apparatus for removing drilling chips or shavings from inside a turbomachine casing comprising: piping adapted for insertion into the turbomachine casing, the piping having a vacuum head at one end and a connector adapted for connection to a vacuum source at an opposite end; and support hardware including a clamp for attaching the piping to the turbomachine casing such that the vacuum head is located below a hole to be drilled.

The invention will now be described in detail in connection with the drawings identified below.

DETAILED DESCRIPTION OF THE INVENTION

Figure 1:
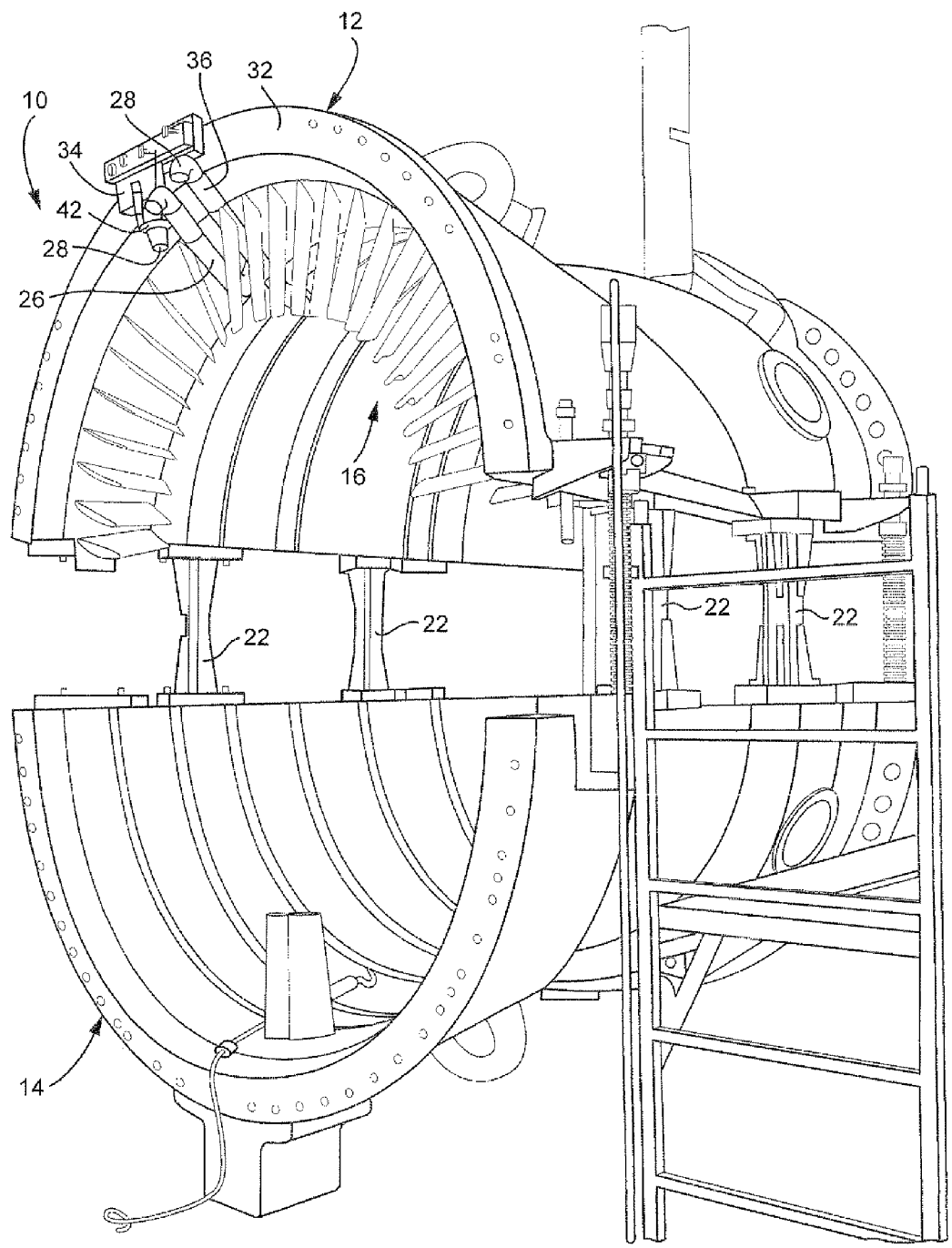
FIG. 1 is a simplified perspective view of upper and lower turbine casing sections, where the upper casing section is raised above the lower casing section for implementing a drilling process in accordance with an exemplary but nonlimiting embodiment described herein.

With reference initially to FIG. 1, a compressor case 10 is shown to include an upper casing half section (or, simply, "upper casing section") 12 and a lower casing half section (or, simply, "lower casing section") 14. In the upper casing section 12, a row of stator blades 16 is visible, it being understood that several rows of stator blades, as well as the remaining blades of the rows of stator blades, are assembled within the upper casing section and that the rotor and its associated rows of blades are assembled within the lower casing section.

Figure 2:
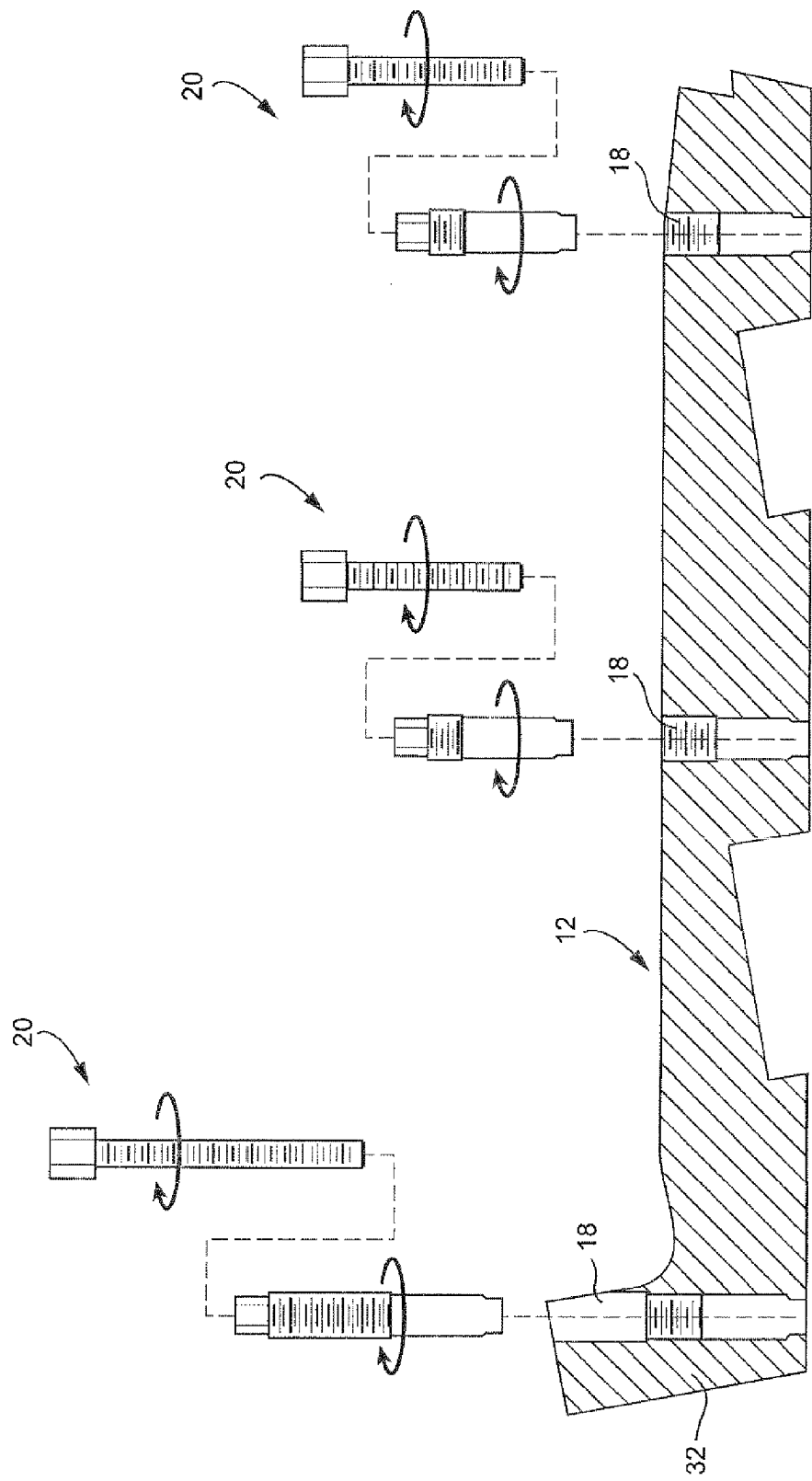
FIG. 2 is a partial section view of the upper casing section showing a plurality of holes drilled in the upper casing section for receiving a corresponding number of sensor elements.

In the example embodiment, and with reference to FIG. 2, it may be required to drill plural holes 18 into the upper casing section 12 for installation of various ancillary components/features such as, for example, engine health monitoring sensors 20 or other instrumentation on a temporary or permanent basis. FIG. 2 shows one possible drilling pattern where holes 28 are to be drilled at three different axial locations, with, for example, two holes (only one shown) spaced circumferentially at each of the three axial locations. The holes 18 may vary in diameter from, for example, about ½ inch to an inch or more, depending on the components or sensors to be installed. In addition, the holes normally will be at least partially threaded as shown in FIG. 2.

In order to drill the holes 18 in the upper casing section 12 in accordance with the exemplary but nonlimiting embodiment, the upper casing section 12 is raised initially from the lower casing section 14 by about 20-30 inches, e.g., 24 inches, as shown in FIG. 1, and supported in the raised position by jacks or other supports 22. This permits sufficient access to the interior of the upper casing section to allow the temporary installation of vacuum apparatus for removing chips/shavings generated during drilling.

Figure 3:
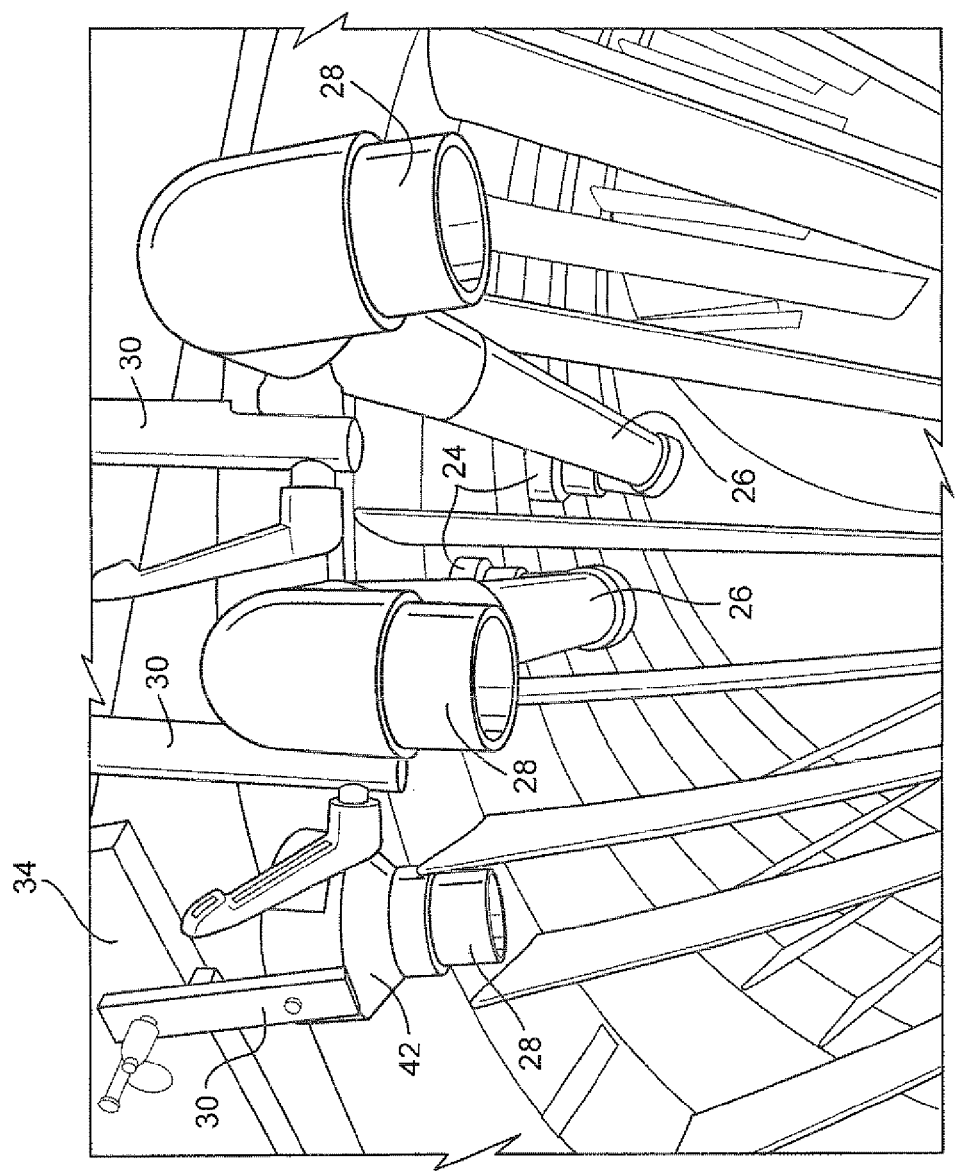
FIG. 3 is a partial perspective view of the upper casing section, showing vacuum piping installed within the upper casing section.
Figure 4:
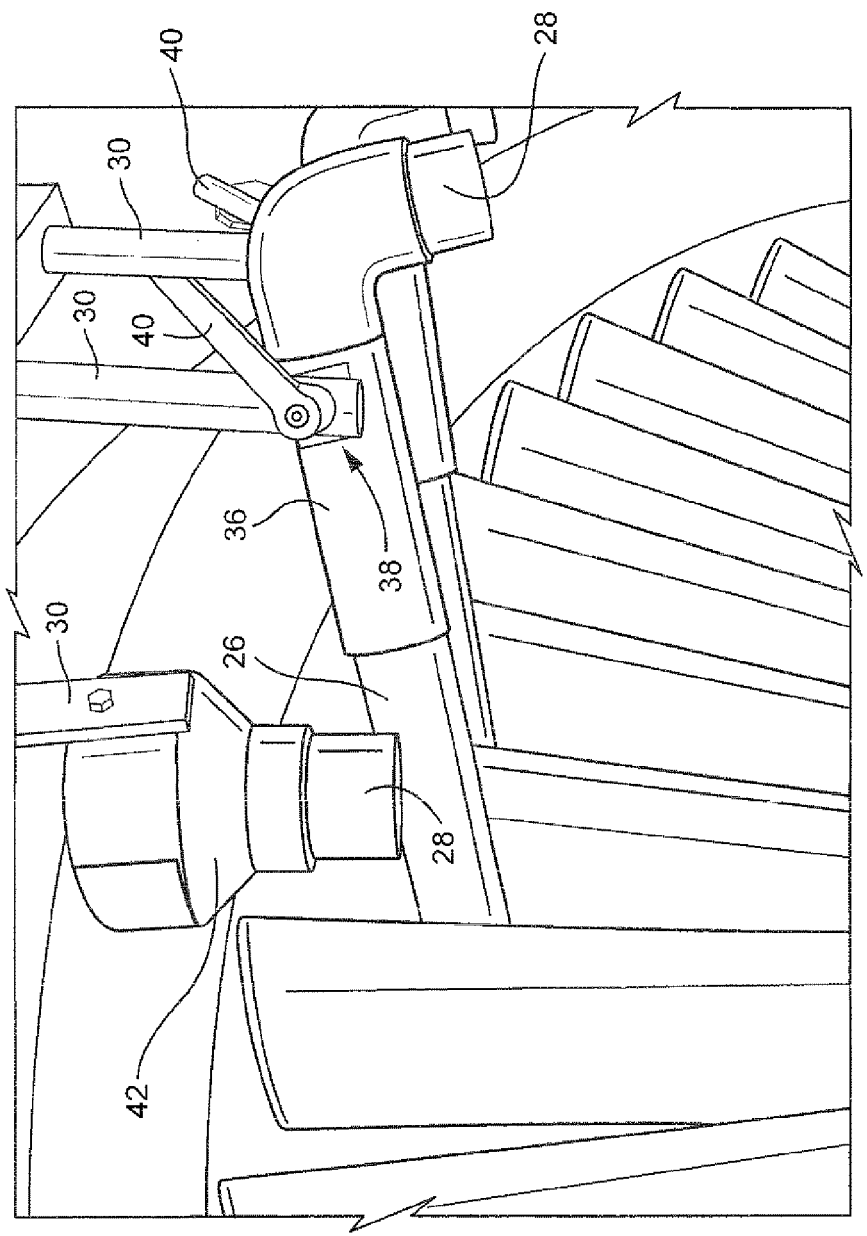
FIG. 4 is another perspective view showing the vacuum piping from a different angle.
Figure 5:
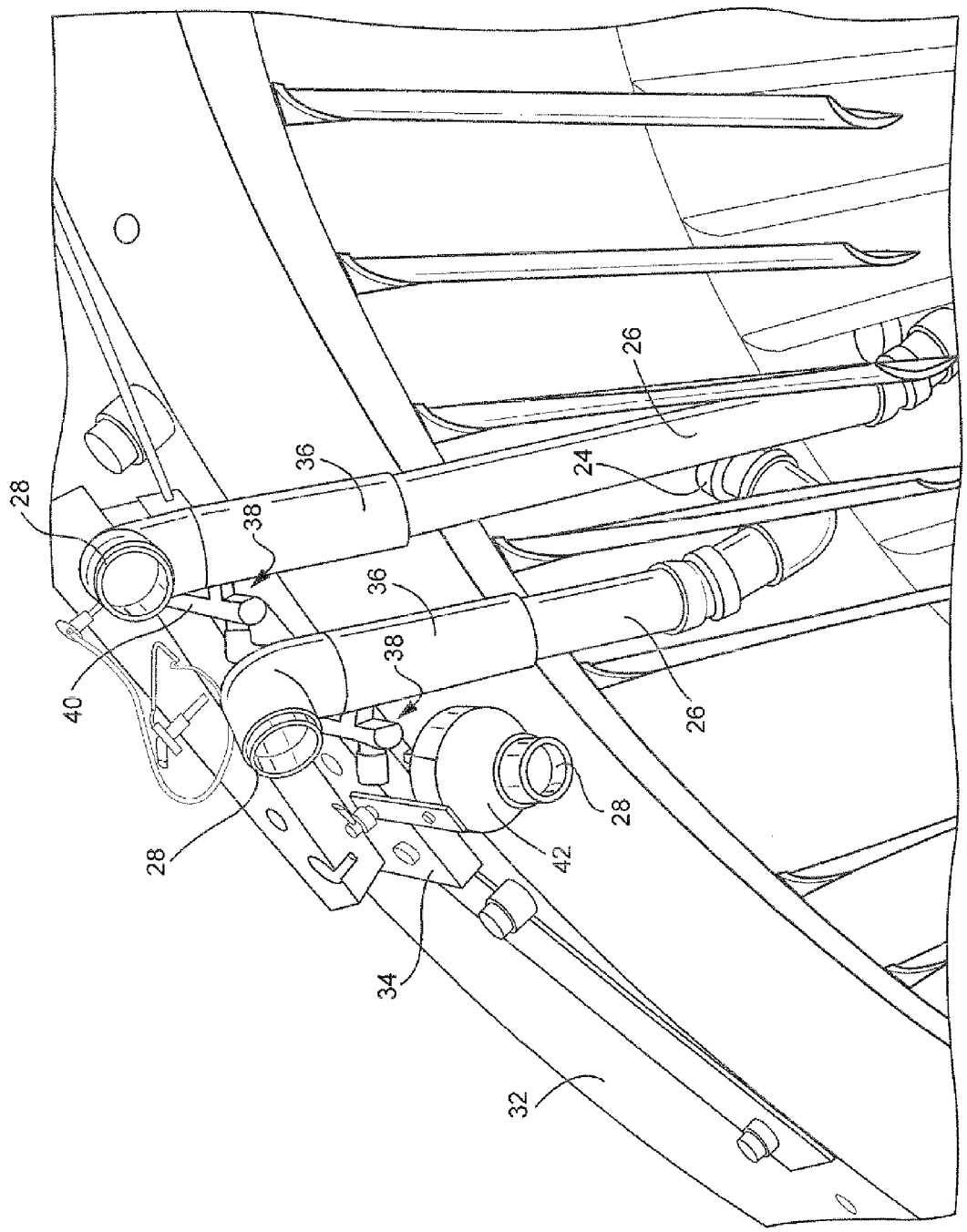
FIG. 5 is still another partial perspective view showing the vacuum piping installed within the upper casing section.

FIGS. 3-5 show in greater detail how piping may be inserted temporarily into the upper casing section 12 to facilitate removal of any drill chips/shavings from each hole location. Specifically, for each hole 18 to be drilled, a piping elbow or vacuum head 24 is fixed to an axially-extending vacuum tube 26 that terminates at a vacuum supply fitting or connector 28 where the vacuum is applied (either directly or via additional piping). Tubes 26 may vary in length to accommodate the different axial locations of the holes 18. The elbow or vacuum head 24 and tubes 26 may be of any suitable material such as metal, PVC or the like, and tubes 26 may have a diameter of, for example, 1 to 3 inches, but all dimensions are subject to change depending on specific applications.

The vacuum head 24 is located directly under and/or engaged with the sensor installation hole location on the casing section. At the opposite end of the piping where a vacuum supply fitting 28 is located, the piping is fixed to a respective support bar 30 that, in turn, is fixed to the upper casing end face 32 or a temporarily-installed attachment plate that is in turn mounted on the casing end face 32. A flexible friction sleeve 36 fitted about the supply pipe 24 and pulls the piping tightly against conventional friction lock device 38 via handle 40.

In the event one of the holes 18 to be drilled lies adjacent a flanged edge or other obstruction in the casing such that it is not possible to have the vacuum head engaged with the casing section interior wall at the hole location, it is within the scope of the invention to utilize a funnel-shaped vacuum head as shown at 42 in FIGS. 3-5 that may be spaced below the casing wall but is nevertheless effective to catch all metal chips and/or shavings created by the drilling process. The diameter of the funnel-shaped head 42 may vary as needed, and, preferably, the funnel-shaped head is aligned substantially with a center line of the hole to be drilled. It is, of course, contemplated that the funnel-shaped head 42 engage the casing surface where practical.

It will be appreciated that the piping hardware is not limited to the specific arrangement described above. For example, tubes 26 may be connected to one or more vacuum sources separately, or all of the tubes 26 may be joined to a single manifold (not shown) that is, in turn, connected to a single vacuum source. The number and location of the holes to be drilled will dictate the location and support points for the piping hardware. It will also be appreciated that the vacuum pressure applied may also vary as required to provide effective chip/shaving removal.

Upon completion of the drilling operation and removal of the sensor package components, the vacuum tubes/heads 26, 24 and any associated mounting hardware (e.g., support rods 30, plate 34) are removed, and the upper casing 12 lowered onto the lower casing 14 and re-secured in the usual manner. Whether the sensor package or other component is installed before or after the re-assembly of the upper and lower casing sections depends on specific applications.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of drilling one or more holes, substantially in situ, in a turbomachine casing, comprising:
   (a) locating piping including at least one vacuum head within the turbomachine casing in proximity to a hole to be drilled;
   (b) drilling at least one hole in the casing such that drill chips or shavings caused by the drilling are collected in the vacuum head; and
   (c) applying a vacuum through said piping to said at least one vacuum head to thereby remove the drill chips or shavings collected in said vacuum head to a location outside the turbomachine casing; and
   wherein said at least one hole comprises multiple holes, and wherein said at least one vacuum head comprises multiple vacuum heads located, respectively, in proximity to each of said multiple holes to be drilled.

2. The method of claim 1 wherein during step (a), each said vacuum head is engaged with an interior surface of said turbomachine casing substantially directly under said at least one hole to be drilled.

3. The method of claim 1 wherein during step (a), each said vacuum head is located below an interior surface of said turbomachine casing, in substantially direct alignment with a center line of said at least one hole to be drilled.

4. The method of claim 3 wherein each said vacuum head comprises a funnel-shaped component.

5. The method of claim 1 wherein each said vacuum head is connected to an axially-oriented section of said piping that extends at least to an edge of said turbomachine casing, said axially-oriented section supported at said edge of said turbomachine casing.

6. The method of claim 1 wherein a vacuum is applied separately to each vacuum head.

7. A method of drilling a plurality of holes, substantially in situ, in a turbomachine casing having separable upper and lower casing sections comprising:
   (a) raising the upper casing section a predetermined distance above the lower casing section;
   (b) for each of said plurality of holes, installing piping including a vacuum head into the upper casing section, locating the vacuum head in proximity to the respective hole to be drilled, and so that said piping extends from each said vacuum head to a location outside the upper casing section;
   (c) drilling said plurality of holes in the upper casing section such that drill chips or shavings caused by the drilling are collected in the vacuum head associated with each respective hole; and
   (d) applying a vacuum through said piping to each said vacuum head to thereby remove the drill chips or shavings collected in each said vacuum head to a location outside said upper casing section.

8. The method of claim 7 wherein during step (b), each said vacuum head is engaged with an interior surface of said upper casing section substantially directly under a respective one of said plurality of holes to be drilled.

9. The method of claim 7 wherein during step (b), said vacuum head is located below an interior surface of said upper casing section, in substantially direct alignment with a center line of said at least one hole to be drilled.

10. The method of claim 7 including securing said piping to said upper casing section to an edge of said upper casing section at a location remote from said vacuum head.

11. The method of claim 10 wherein securing said piping to said upper casing section is achieved at least partially by using a sleeve clamp.

12. The method of claim 7 wherein, during step (a) the upper casing section is raised between about 20-30 inches.

13. The method of claim 7 further comprising:
   (e) removing the piping and vacuum head at each of said plurality of holes; and
   (f) lowering the upper casing section onto the lower casing section.

14. Apparatus for removing drilling chips or shavings from inside a turbomachine casing comprising:
   piping adapted for insertion into the turbomachine casing, the piping having a vacuum head at one end and a connector adapted for connection to a vacuum source at an opposite end;

and support hardware including a clamp for attaching the piping to the turbomachine casing such that the vaccum head is located below a hole to be drilled; and wherein said piping includes plural, substantially straight pipe sections, each having a vacuum head at one end.

15. The apparatus of claim 14 wherein each said vacuum head is funnel-shaped.

16. The apparatus of claim 14 including support rods for securing said substantially straight pipe sections to said turbomachine casing.

17. The apparatus of claim 14 wherein said substantially straight pipe sections are constructed of PVC.

18. The apparatus of claim 14 wherein each said vacuum head comprises a pipe elbow.

* * * * *

UNITED STATES PATENT AND TRADEMARK OFFICE
CERTIFICATE OF CORRECTION

PATENT NO. : 8,636,449 B2  
APPLICATION NO. : 13/095498  
DATED : January 28, 2014  
INVENTOR(S) : Hynous et al.

It is certified that error appears in the above-identified patent and that said Letters Patent is hereby corrected as shown below:

In the Specification:

At column 2, line 42, change "28" to --18--

At column 3, line 10, insert --34-- after --attachment plate--

Signed and Sealed this
Sixth Day of May, 2014

Michelle K. Lee
*Deputy Director of the United States Patent and Trademark Office*